Feb. 17, 1959 J. SCHNAPP ET AL 2,873,520
POWER DRIVEN SHAVER AND HAIR TRIMMER
Filed March 14, 1956 2 Sheets-Sheet 1
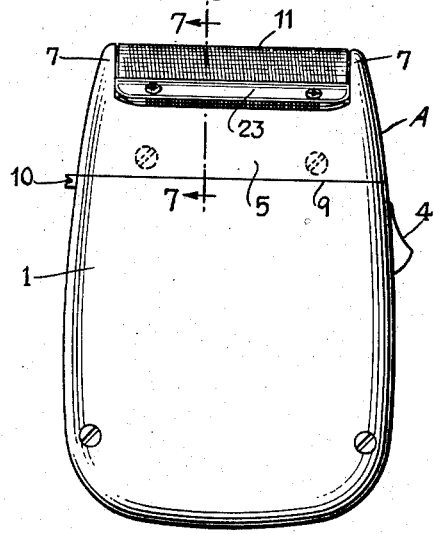
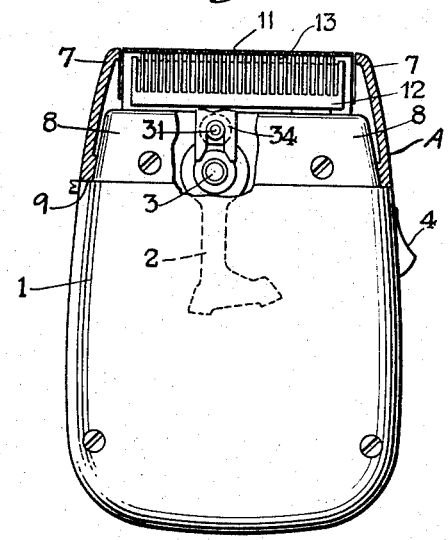
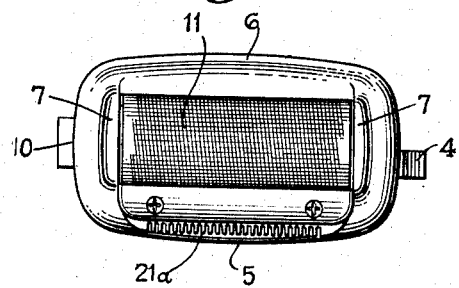
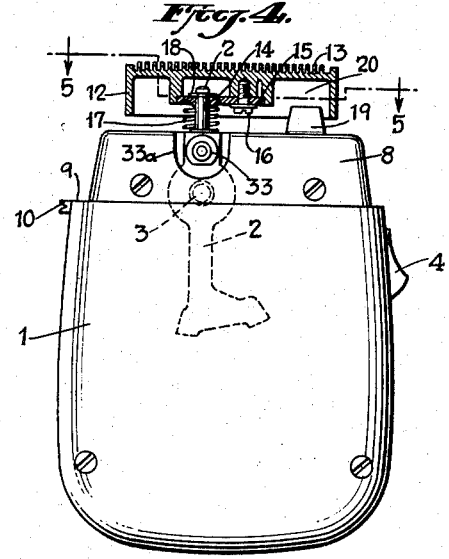
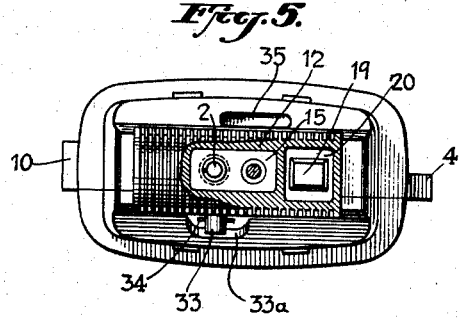
INVENTORS.
JAMES SCHNAPP,
HEINZ WERNER.
BY
ATTORNEYS.

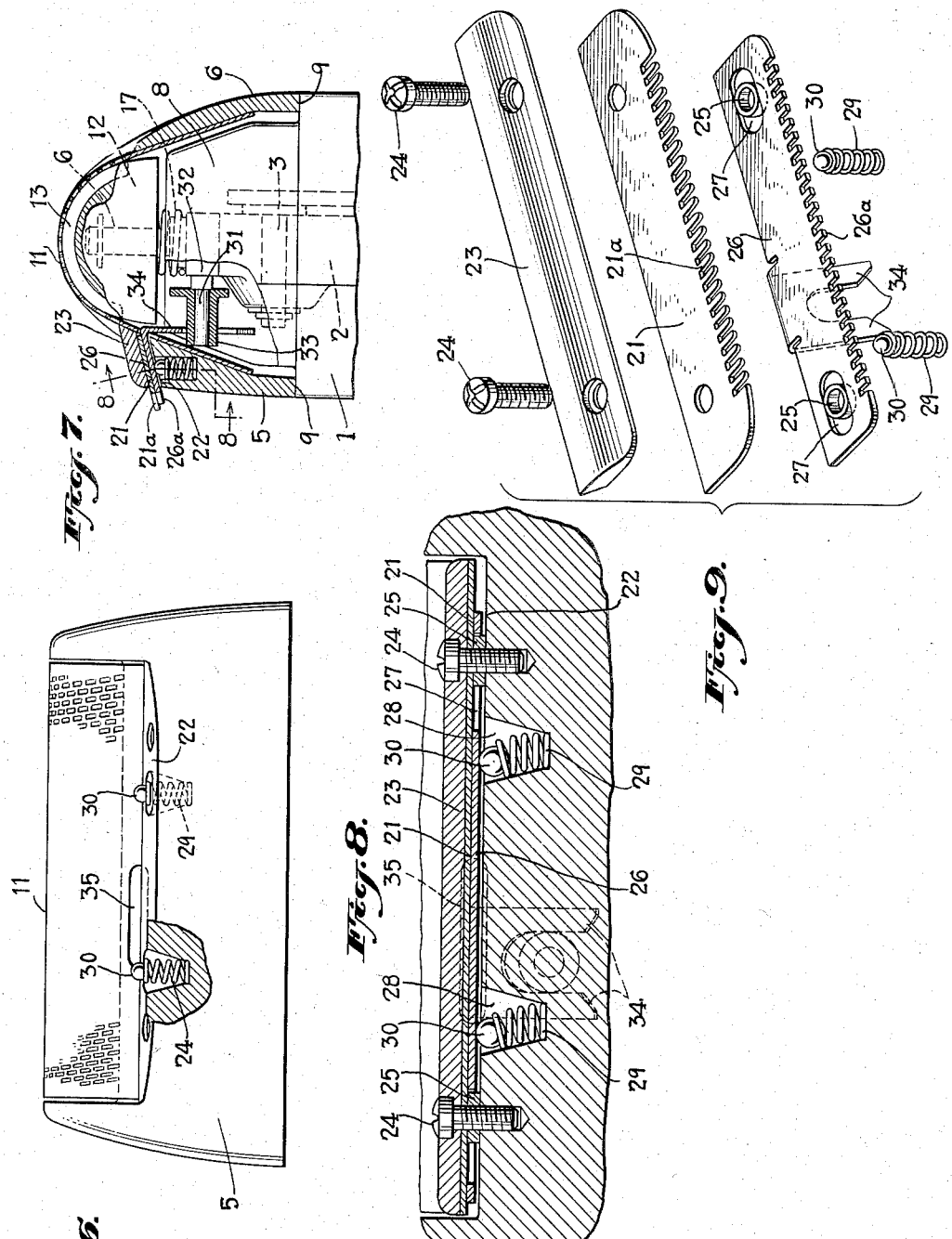

+ # United States Patent Office 2,873,520  
Patented Feb. 17, 1959

2,873,520

POWER DRIVEN SHAVER AND HAIR TRIMMER

James Schnapp, Bronx, N. Y., and Heinz Werner, Stamford, Conn., assignors, by mesne assignments, to Ronson Corporation, Newark, N. J., a corporation of New Jersey Application March 14, 1956, Serial No. 571,395

4 Claims. (Cl. 30—34)

Various forms of power driven shaver have long been known in which a main section of the shaver was constructed to provide a fine cut for close shaving purposes, and an auxiliary section was also provided for the purpose of trimming hairs too long to be sheared off by the main shaving section. In one of its aspects the present invention contemplates a shaver of the above character wherein the user may readily utilize the close shaving section while the long-hair trimmer is disconnected from the driving power so as to lie at rest. For practical reasons the total available power is usually limited, and to enable the trimmer to function effectively when needed, the cutters constituting it should be pressed forcefully into cutting engagement. This entails substantial power consumption even though the trimmer be running idle, and the trimmer normally will be used less frequently than the shaving section. Therefore it is advantageous to so construct and arrange the mechanism that the long-hair trimmer may remain stationary while the close shaving section is being used. On the other hand the device is so constructed that the trimmer may be readily shifted to engage the activating mechanism when long-hair cutting is desired. During use of the long-hair trimmer, the close shaving section will run idle, the parts being so disposed that when the trimmer is held in operating position in contact with the skin, the close shaving section will assume a position out of skin engaging relation. The close shaving section then running idle, the trimmer will enable effective and exact straight line trimming operations to be performed, such as may be needed at the neckline, and also the trimming of sideburns, moustaches, and hairs projecting from the nostrils, etc. Preferably as later described in more detail, the long-hair trimmer and its immediate driving elements are carried by a detachable head structure, which latter is selectively engageable with the body of the shaver in reversed positions with respect to the latter, the driving connection for the hair trimmer being engaged with the power driven elements of the shaver in one of these positions, but disconnected therefrom in the other position. By reversing the position of the head structure on the body of the shaver, the user accordingly may selectively activate and deactivate the long-hair trimmer.

In other aspects the invention contemplates certain structural and mounting improvements with respect to the long-hair trimmer, and with respect to the reduction of friction losses involved in driving the long-hair trimmer. Further objects and advantages of the invention will be in part obvious and in part specifically mentioned in the description hereinafter contained which taken in conjunction with the accompanying drawings, discloses a power driven shaver and hair trimmer constructed to operate in accordance with the invention. The disclosure should be regarded as merely illustrative of the invention in its broader aspects. In the drawings:

Fig. 1 is a general side view of the above mentioned preferred form of the invention.

Fig. 2 is a view similar to Fig. 1 but with certain parts cut away at the head of the device to expose its interior construction.

Fig. 3 is a top plan view of the device shown in Fig. 1.

Fig. 4 is a view similar to Fig. 1, but with the head structure removed, and the close cutting movable cutter shown in longitudinal section.

Fig. 5 is a section as indicated by the broken line 5—5 in Fig. 4.

Fig. 6 is an enlarged side view of the detachable head structure with the long-hair trimmer removed.

Fig. 7 is an enlarged transverse sectional view as indicated by the broken line 7—7 of Fig. 1.

Fig. 8 is an enlarged detailed sectional view as indicated by the broken line 8—8 of Fig. 7.

Fig. 9 is an exploded perspective view of the main parts constituting the long-hair trimmer.

The invention is illustrated as applied to a shaver having a main body portion or casing 1 which need not be described in detail, but may be understood as provided with an appropriate cutter actuating member extending upwardly therefrom. In the illustrated embodiment of the invention, this cutter actuating member takes the form of a rocker arm 2 (Figs. 2, 4, and 7) which is mounted to swing about the stud 3 (Figs. 2 and 7). An appropriate motor (not illustrated) for activating the arm 2 is to be understood, and a button 4 may be understood as provided for turning the power on and off.

The head structure of the device is shown as having a head frame member A provided with opposite side walls 5 and 6, and end walls provided with upwardly extending ears 7, this frame being telescopically engageable around a hub 8 extending upwardly at the top of the main body portion 1, so that the head frame seats against a ledge 9 on the body. An appropriate depressible detent 10 may be understood as provided to hold the head structure detachably in position on the body 1.

For fine cutting, close shaving purposes the head structure is shown as provided with an exceedingly thin and flexible perforated metal strip 11 which functions as a stationary cutter and which is arched as shown in Fig. 7 so that its lower end portions lie against the inner surfaces of the side walls 5 and 6 of the head frame and are appropriately secured thereto, while its intermediate perforated portion is cylindrically curved as shown in Fig. 7, and exposed in the space between the opposite ears 7 of the head frame.

Underneath the curved portion of this member 11 is located a movable cutter member having a base 12 in which a series of spaced arcuately shaped cutter blades 13 are anchored, this movable cutter being carried by the body portion of the device so that it remains in place when the head structure is detached. In Fig. 4, appropriate details are shown for mounting the movable cutter and connecting it to the main actuating member 2. As there shown, the pivoted arm 2 is provided with an upper extension 14 which passes through a plate 15 secured to the under surface of the movable cutter base 12, by means of a screw 16. A spring 17 (Fig. 4) urges the movable cutter upwardly into engagement with the inner surface of the stationary perforated member 11, and a stop 18 at the upper end of extension 14 limits the extent of this upward movement, the engagement of the last mentioned parts affording tilting movement of the movable cutter in a vertical plane, with respect to the extension 14, and also affording rocking movement of the movable cutter in a horizontal plane, about the extension 14 as an axis. The extent of this rocking movement however is limited by a lug 19 which extends upwardly from the hub 8 and engages loosely in a recess 20 in the lower face of the movable cutter base 12. When the head structure is placed in operating position, the movable cutter is slightly depressed against the pressure of spring 17, and the above described mounting of the movable cutter, together with the extreme flexibility of the perforated member 11, enables the close shaving cutting elements of the device to conform their engaging cutting areas very precisely to each other. The above described lug 19 serves as a stop preventing misalinement of the movable cutter with respect to the perforated member 11, to an extent which might injure the delicate member 11 during assembly of the head structure, and yet the stop 19 affords sufficient play to enable the cutting members to accurately conform to each other as above described.

The long-hair trimming elements, along with the immediately accompanying driving connection, are carried by the head frame above described, so as to be detachable therewith. In the illustrated embodiment of the invention, the long-hair trimmer includes a stationary cutter in the form of a comb 21 which is held in spaced relation to an obliquely directed inclined shelf 22 running along the upper edge of the side wall 5 of the head frame. A clamping strip 23 overlies the comb 21, and screws 24 (Fig. 8) pass through the strip 23, comb 21, and spacer members 25, into the side wall 5 to clamp the comb 21 fixedly in position somewhat spaced above the shelf 22, and with its teeth 21a projecting out obliquely beyond the side wall 5 as shown in Fig. 7.

The movable cutter member 26 of the long-hair trimmer is interposed between the comb 21 and shelf 22, and is provided with teeth 26a which preferably are of slightly different pitch as compared to the teeth 21a with which they cooperate. In the form shown the movable cutter 26 is provided with slots 27 (Fig. 9) in which the spacer members 25 are received so that the spacer members serve as guides for the movable cutter in its reciprocatory movements longitudinally of the stationary comb 21. To urge cutter 26 effectively into cutting relationship with comb 21 and at the same time minimize friction losses, there are preferably provided directly beneath the shelf 22 a plurality of sockets 28 (Fig. 8) having flaring mouths, and in which springs 29 are seated at their lower ends, balls 30 being cradled in the upper ends of the springs and being pressed by the springs into engagement with the lower surface of the movable cutter 26. As the movable cutter reciprocates, the lower ends of the springs 29 are held stationary in the bottoms of the sockets 28, but the bodies of the springs and the balls 30 carried thereby rock back and forth in response to the reciprocatory movements of the cutter, with a minimum of friction losses at the points of engagement between the spring structure and the cutter.

In the illustrated form of the invention, power for actuating the movable cutter 26 is derived from a stud 31 (Figs. 2 and 7) which is fixed within a hub 32 (Fig. 7) provided in the main actuating member 2 somewhat above its pivotal axis 3. Preferably this stud 31 has affixed thereto a wear sleeve 33 of nylon or the like, and thus as the main driving member 2 oscillates to actuate the close shaving cutter which carries the arcuate blades 13, the auxiliary stud 31 and its sleeve 33 being closer to the axis 3, will move the cuter 26 back and forth through a shorter path as compared to the close shaving blades 13. This is of advantage in connection with the long-hair trimming operation.

An appropriate detachable driving connection is established between the movable cutter 26 of the long-hair trimmer and the stud 31, in such manner that when the parts are in the position shown in Fig. 7, the long-hair trimmer is activated, this driving connection being broken when the head structure is removed from the operating position shown in Fig. 7. In the illustrated form of the invention, for the last mentioned purposes the movable cutter 26 is provided with a forked tongue 34 which extends through a slot 35 (Fig. 6) in the perforated member 11, and then extends downwardly to slidably embrace the sleeve 33. A recess 33a (Figs. 4 and 5) may be provided in the hub 8, adjacent the path of movement of the parts 33 and 34.

When the head structure is detached, the long-hair trimming elements including the connecting member 34 come off with it, and driving connection to the stud 31 is reestablished when the head structure is replaced to the position shown in Fig. 7. During detachment the movable close shaving cutter remains approximately in place. Preferably the head structure is constructed and arranged to be reversible with respect to the position in which it can be assembled in mating relation to the body portion 1 of the device—i. e. the head structure will fit selectively on the body either in the position shown in Fig. 7 in which the connecting member 34 is engaged with the driving stud 31, or in a reversed position (twisted 180° about a vertical axis) wherein the wall 5 of the head structure (as the parts appear in Fig. 7) will be located at the right, and the wall 6 at the left. In such reversed position the close shaving section of the device will operate as already described, i. e. the arcuately curved cutting blades 13 and the perforated portion of the member 11 will conform closely to each other for normal close shaving purposes, but the connecting member 34 will no longer engage in driven relationship to the stud 31. Therefore in the above mentioned reversed position of the head structure, the long-hair trimmer will be at rest, which is of advantage, since the long-hair trimmer will usually be needed only at intervals, and the available power had beeter be applied solely to the close shaving section of the device, except when the long-hair trimmer is being used. When the close shaving section of the device is in use, the body of the shaver will normally be traversed over the area to be shaved, with the device held about perpendicular to the skin, the long-hair trimmer then being positioned well away from the skin. When the long-hair trimmer is being used the teeth 21a will be drawn over the area to be trimmed at an oblique angle to the skin, the close shaving section of the device then running idle, the relative positions of the two sets of cutters being such that when the trimmer is held in cutting position, the close shaving section will be clear of the skin. In the illustrated form of the invention the hub 8 of the body portion of the device is shown as provided with a socket 35 (Fig. 5) into which the connecting member 34 is loosely received when the head structure is fitted into the reversed position above referred to, in which position the long-hair trimmer is disconnected from the actuating member 2.

While the invention has been disclosed as carried out by a shaver and trimmer of the above described specific construction, it should be understood that changes may be made therein without departing from the invention in its broader aspects, within the scope of the appended claims.

What is claimed is:

1. A power driven shaver including a main casing, a power driven actuating member carried thereby and disposed at the upper portion thereof, a head frame, said casing and head frame having means detachably interengaging therebetween whereby the head frame may be engaged with the upper portion of the main casing in either of two reversed positions with respect to the casing, a stationary cutter of the close shaving type carried by said head frame to afford detachment thereof along with the head frame, a cooperating movable cutter interposed between said first mentioned cutter and said actuating member, a stationary cutter of the long hair cutting type carried by said head frame, a movable cutter cooperating with said last mentioned stationary cutter and also carried by said head frame, and means detachably engaging said last mentioned movable cutter in driving relation to said actuating member and so arranged with relation to the casing that said last mentioned movable cutter is engaged in driving relation with said actuating member when said head frame is engaged in one of its aforesaid positions with respect to the main casing, and disengaged from said driving relation when said head frame is engaged in the other of its aforesaid positions with respect to the main casing.

2. A power driven shaver including a main casing having a power driven actuating member carried thereby and projecting from the upper portion thereof, a head frame detachably mounted at the upper portion of the casing, said head frame carrying a thin flexible metal strip of the close shaving type having a curved perforated portion exposed at the upper portion of the frame, a cooperating movable cutter carried by said main casing in driven relation to said actuating member, means urging said movable cutter into contact with the under surface of said perforated portion, means affording rocking movements of the movable cutter transversely with respect to said casing when said head frame is detached, said casing carrying a stop member projecting upwardly therefrom, said stop member including means engageable with said movable cutter to limit the extent to which said movable cutter can rock transversely as aforesaid while the head frame is detached, to thereby limit the extent to which the movable cutter can be misaligned with respect to the position which the head frame assumes when mounted in operative position on the main casing.

3. A power driven shaver including a main casing, a head frame detachably mounted at the upper portion of the casing, said head frame having an opening extending through the upper portion thereof, a stationary cutter of the close shaving type carried by said head frame and spanning said opening, said head frame having a shelf running along a side of said opening and extending transversely outward from the body of the frame, a stationary comb of the long hair cutting type disposed above and lying along said shelf, a reciprocable cutter of the long hair cutting type also positioned above and lying along said shelf adjacent said comb, upwardly extending clamping elements seated in said shelf and extending upwardly through said stationary comb and reciprocable cutter to hold said comb in operative position with respect to said reciprocable cutter, and elongated slot means guiding said reciprocable cutter to afford sliding movement thereof longitudinally of said comb.

4. A power driven shaver including a main casing, a head frame detachably mounted at the upper portion of the casing, said head frame having an opening extending through the upper portion thereof, a stationary cutter of the close shaving type carried by said head frame and spanning said opening, said head frame having a shelf running along a side of said opening and extending transversely outward from the body of the frame, a stationary comb of the long hair cutting type disposed above and lying along said shelf in spaced relation thereto, a reciprocable cutter of the long hair cutting type also lying along said shelf and interposed between said stationary comb and shelf, upwardly extending clamping elements seated in said shelf and extending upwardly through said stationary comb and reciprocable cutter, to hold said comb in operative position with respect to said reciprocable cutter, said shelf having recesses therein which are spaced along said reciprocable cutter, and spring means rockably mounted in said recesses to urge said reciprocable cutter upwardly toward said comb.

References Cited in the file of this patent
UNITED STATES PATENTS

| | | |
|---|---|---|
| 2,198,118 | Knapp | Apr. 23, 1940 |
| 2,265,305 | Nyhagen | Dec. 9, 1941 |
| 2,269,358 | Ericson et al. | Jan. 6, 1942 |
| 2,370,544 | Jepson et al. | Feb. 27, 1945 |
| 2,371,242 | Jensen | Mar. 13, 1945 |
| 2,391,695 | Flegel | Dec. 25, 1945 |
| 2,661,531 | Streng | Dec. 8, 1953 |
| 2,670,534 | Haber | Mar. 2, 1954 |
| 2,694,251 | Tissot et al. | Nov. 16, 1954 |
| 2,734,266 | Schreyer | Feb. 14, 1956 |